(12) United States Patent
Kitchen et al.

(10) Patent No.: US 10,499,571 B2
(45) Date of Patent: Dec. 10, 2019

(54) TARP ROLLER

(71) Applicant: 2579099 Ontario Inc., Puslinch (CA)

(72) Inventors: Jordan Kitchen, Puslinch (CA); Ian Trepte, Guelph (CA); John Bladon, Guelph (CA)

(73) Assignee: 2579099 ONTARIO INC., Puslinch (CA)

( * ) Notice: Subject to any disclaimer, the term of this patent is extended or adjusted under 35 U.S.C. 154(b) by 0 days.

(21) Appl. No.: 15/933,802

(22) Filed: Mar. 23, 2018

(65) Prior Publication Data

US 2019/0021240 A1 Jan. 24, 2019

Related U.S. Application Data

(60) Provisional application No. 62/534,368, filed on Jul. 19, 2017.

(51) Int. Cl.
*A01G 13/02* (2006.01)
*A01B 59/043* (2006.01)
*A01B 63/10* (2006.01)

(52) U.S. Cl.
CPC ..... *A01G 13/0287* (2013.01); *A01G 13/0268* (2013.01); *A01B 59/043* (2013.01); *A01B 63/1006* (2013.01); *A01G 2013/0218* (2013.01)

(58) Field of Classification Search
CPC ............ A01G 13/0287; A01G 13/0268; A01G 2013/0218; A01B 59/043; A01B 63/1006; E02B 3/121
See application file for complete search history.

(56) References Cited

U.S. PATENT DOCUMENTS

| 3,687,392 | A | | 8/1972 | Parry | |
|---|---|---|---|---|---|
| 4,632,329 | A | * | 12/1986 | Burley | A63C 19/12 104/136 |
| 5,215,278 | A | * | 6/1993 | Hess | A01G 20/10 242/557 |
| 5,454,431 | A | | 10/1995 | Ledwig | |
| 5,536,116 | A | * | 7/1996 | Lammers | B09B 1/004 405/129.9 |
| 5,709,351 | A | * | 1/1998 | Osborn | B65H 75/425 242/391.3 |
| 6,299,094 | B1 | | 10/2001 | James, Jr. | |

(Continued)

FOREIGN PATENT DOCUMENTS

FR 2667759 A1 4/1992

*Primary Examiner* — William A. Rivera
(74) *Attorney, Agent, or Firm* — Patent Law of Virginia, PLLC; Brian J. Teague

(57) ABSTRACT

A tarp roller for rolling a tarp or other ground cover has a frame adapted for mounting to a tow vehicle. The frame has a first support arm and a second support arm extending therefrom in spaced part relation. A primary rotatable spindle is powered and removably connected between the first support arm and the second support arm. A retainer to retain the tarp against the primary rotatable spindle comprises an elongate member mounted in removable spaced apart, coaligned relation with the primary rotatable spindle to move with the primary rotatable spindle as it rotates. The tarp roller further comprises further a secondary guide roller rotatably attached to the frame at a position above and forward of the primary rotatable spindle. A method of rolling a tarp is provided.

9 Claims, 5 Drawing Sheets

(56) References Cited

U.S. PATENT DOCUMENTS

| | | | |
|---|---|---|---|
| 6,575,393 B1 * | 6/2003 | James, Jr. | A01G 13/0287 242/390 |
| 6,764,039 B1 * | 7/2004 | James, Jr. | A01G 13/0287 242/403 |
| 7,018,135 B2 | 3/2006 | Kaul et al. | |
| 7,600,949 B2 | 10/2009 | Ruiz | |
| 8,430,601 B1 * | 4/2013 | Chadwick | E02F 5/106 405/159 |
| 8,784,007 B2 * | 7/2014 | Wilson | B09B 1/004 242/557 |
| 9,540,213 B2 * | 1/2017 | Holverson | B65H 75/4481 |
| 9,901,041 B2 * | 2/2018 | Manghi | B65H 75/403 |
| 9,908,264 B2 * | 3/2018 | Morris | B09B 3/00 |

* cited by examiner

TARP ROLLER

CROSS-REFERENCE TO RELATED APPLICATIONS

This application claims priority to U.S. Provisional Application Ser. No. 62/534,368, filed Jul. 19, 2017, the contents of which are incorporated herein by reference in its entirety.

FIELD OF THE INVENTION

The present invention relates generally to rollers for mechanically deploying tarps or similar sheeting cover materials on golf greens, sports fields, landscaped areas, landfill sites and the like.

BACKGROUND OF THE INVENTION

Much of the cost of operating a golf course is attributable to the expense involved in planting, maintaining and grooming the turf of golf greens. In geographic regions which experience harsh winters considerable time, effort and resources may be required to repair portions of turf killed off by freezing, desiccation, and damage from animals grazing or scavenging for food. In order to reduce off season turf damage and to shorten the time required to prepare golf courses for use at the beginning of a new playing season, many course operators use turf covers to protect greens during the off season. There are many benefits to using turf covers including reduction of winter kill, preventing animal damage, maintaining less extreme ground temperatures, reducing fertilizer evaporation, and promoting healthy plant roots and earlier turf green up. The turf covers used on the greens are made of a breathable fabric that allows for sun and water infiltration while keeping the surface under the tarp warmer than the air above it. By necessity turf covers are expansive, taking the form of strips or sheets of tarp covering thousands of square feet of area. The tarps are laid and secured to cover the turf in the fall and then removed in early spring at the beginning of the growing season.

It is extremely difficult to remove soiled greens covers (tarps) in early spring for a number of reasons. First, the timing of tarp removal is always during the spring melt. The weather can range from cold and sunny to cool and raining. Conditions are not favorable for outdoor work. The ground may be soft and muddy. The tarps are usually wet, heavy and soiled. In order to remove the tarp covering, the tarps have typically been folded and rolled manually much like a sleeping blanket is rolled up. The work is awkward, dirty and very labour intensive, which makes it expensive. It is difficult to motivate a seasonal work force to return to work in later winter or early spring to remove these covers.

There is a need for a device which can mechanize the tarp removal process, particularly the steps of uptake and rolling of the tarps after they have been folded into strips, and the transport of rolled tarps to storage facilities. There is a need for a device which can both remove water from the tarps and roll them up into a compact roll. Since the work of deploying and removing tarps from golf greens or other turf surfaces occurs outdoors and on site, there is a need for a device which is rugged and yet easy to operate. It should be a simple matter to remove rolled tarps from the device with a minimum of workers' physical exertion.

SUMMARY OF THE INVENTION

A tarp roller for rolling a tarp comprises a frame adapted for mounting to a tow vehicle. The frame has a first support arm extending therefrom, and a second support arm extending therefrom spaced part from the first support arm. A primary rotatable spindle is powered and removably connected between the first support arm and the second support arm and a retainer retains the tarp against the primary rotatable spindle. The retainer comprises an elongate member mounted in removable spaced apart, coaligned relation with the primary rotatable spindle to move with the primary rotatable spindle during rotation thereof. The retainer is mounted to the primary rotatable spindle by a retainer mounting plate which defines a channel to receive the elongate member in torque transmitting engagement. The tarp roller further comprises a secondary guide roller rotatably attached to the frame at a position above and forward of the primary rotatable spindle.

In a method of rolling a tarp the first step is feeding the tarp over a secondary roller attached to a frame of a tarp roller at a position above and forward of a primary rotatable spindle. The tarp is placed between the primary rotatable spindle and a retainer comprising an elongate member mounted in removable spaced apart, coaligned relation with the primary rotatable spindle. The primary rotatable spindle is rotated in a first direction to take up the tarp. After the tarp has been rolled onto it, the primary rotatable spindle is rotated in an opposite direction to release tension within the rolled tarp. The primary rotatable spindle and the retainer are separated from the frame of the tarp roller. The primary rotatable spindle and the retainer are removed from the rolled tarp.

BRIEF DESCRIPTION OF THE DRAWINGS

The foregoing summary, as well as the following detailed description of the disclosure, will be better understood when read in conjunction with the appended drawings. For the purpose of illustrating the disclosure, there are shown in the drawings embodiments which are presently preferred. It should be understood, however, that the disclosure is not limited to the precise arrangements and instrumentalities shown in the drawings.

DETAILED DESCRIPTION OF THE INVENTION

Figure 1:
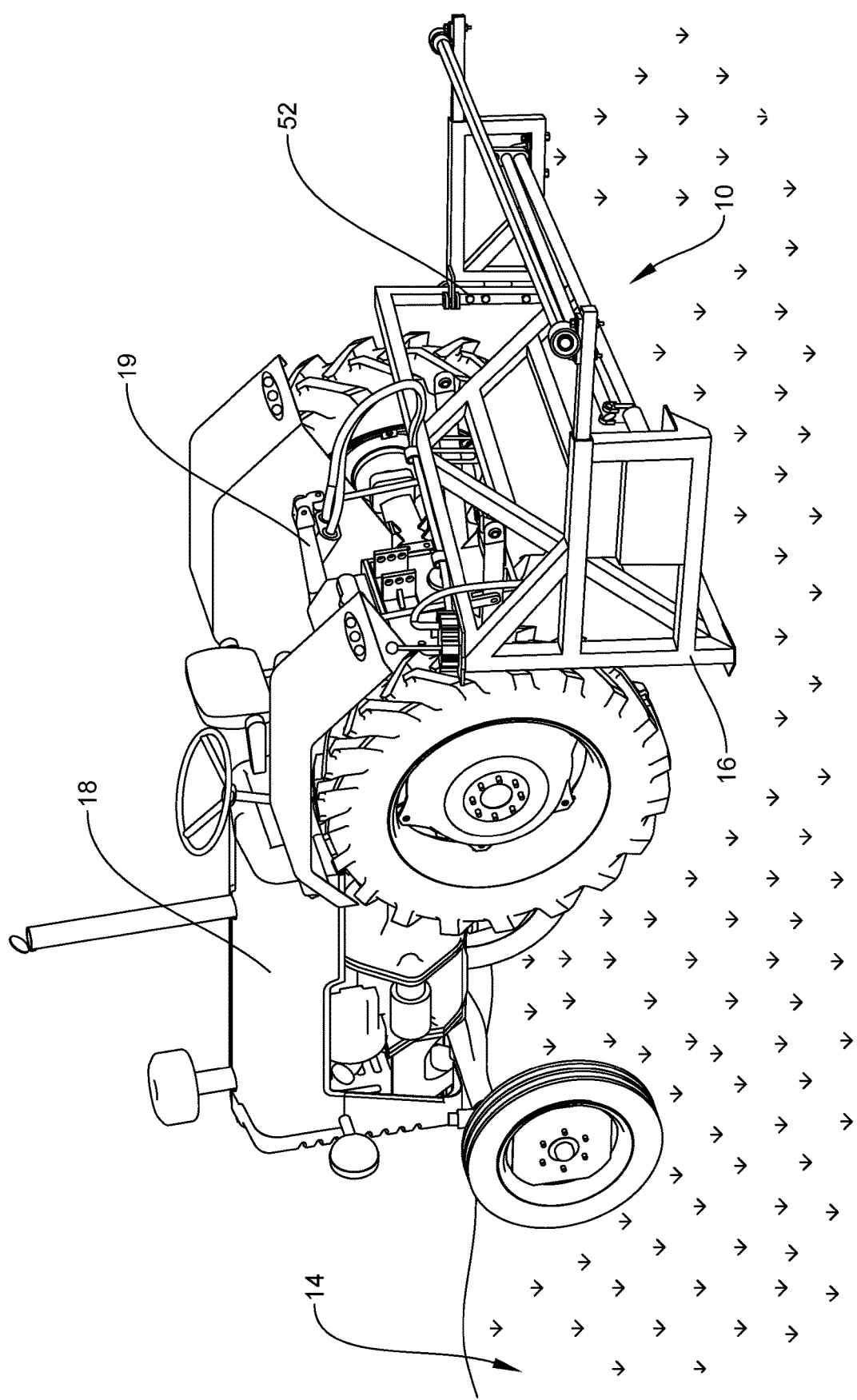
FIG. 1 is a perspective view showing a tarp roller according to a preferred embodiment of the present invention.

Referring now to the drawings, a tarp roller is shown generally by reference numeral 10. The tarp roller 10 has been designed to mechanize the process of rolling and unrolling a tarp 12 used to cover a ground surface 14. It is should be noted that this tarp roller 10 may have other applications in agriculture, property management, management of sports facilities, etc. to assist in the rolling (spooling) of the shade covers, as well as other sheet materials and flexible tubing materials.

The tarp roller 10 comprises a frame 16 adapted for mounting to a tow vehicle 18. The tow vehicle 18 shown in FIG. 1 is a tractor, which is the type of vehicle most commonly used, but other options, such as a fork lift, mower, utility vehicle, etc. could be substituted. The frame 16 is preferably constructed from A500 Grade steel. The frame 16 must be sufficiently robust to support the weight of a roll of tarp which, inherent in its elongated shape and size may subject the frame 16 to forces which could cause buckling or sagging. It has been found that constructing the frame 16 from rectangular steel tube provides needed robustness and rigidity to eliminate torque particularly in the support arms. An A-Frame design is utilized to effectively transfer the load from the ends of the frame to the center tractor mounting points.

Figure 4:
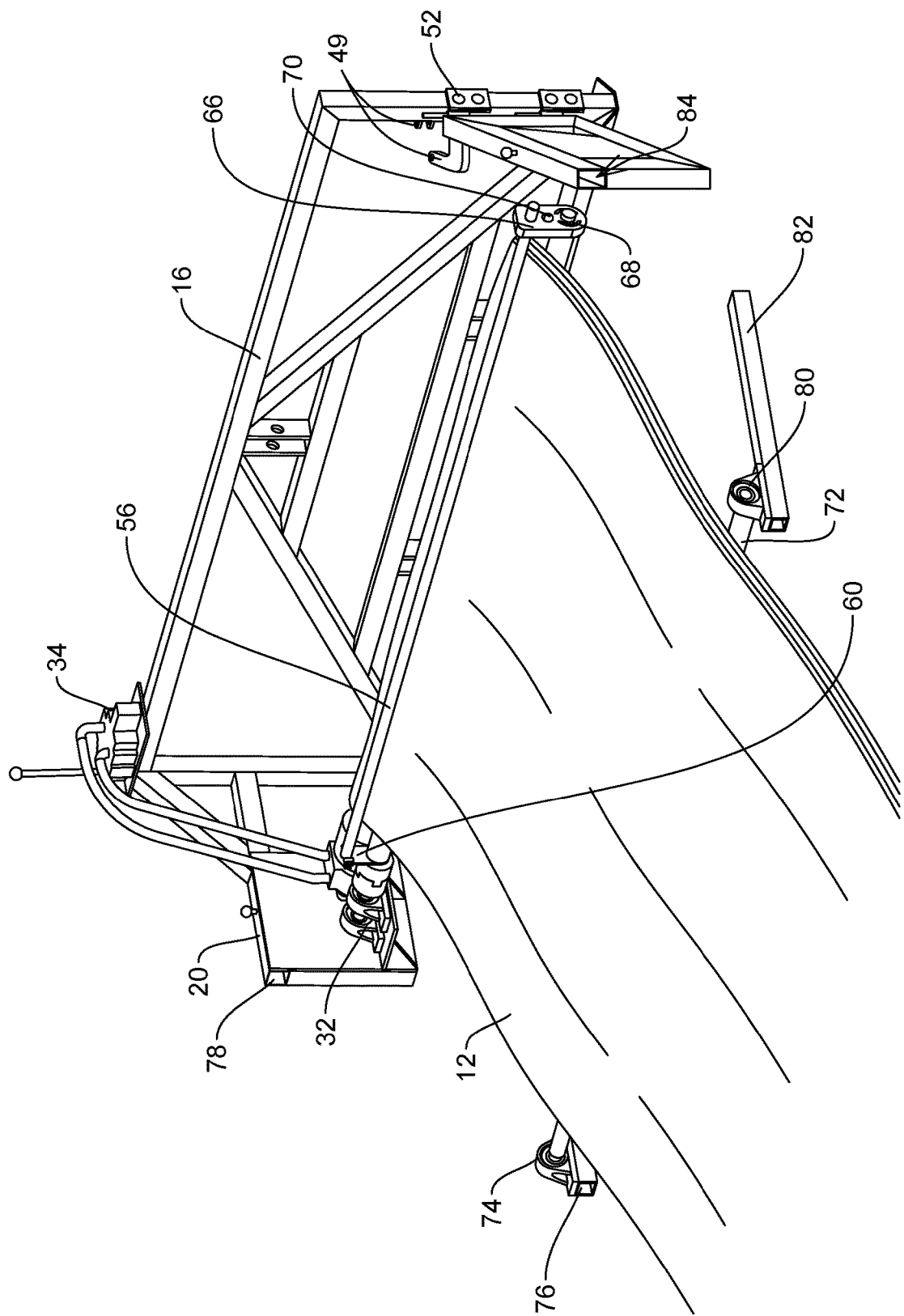
FIG. 4 is a perspective view of a tarp placed onto a tarp roller for rolling.
Figure 5:
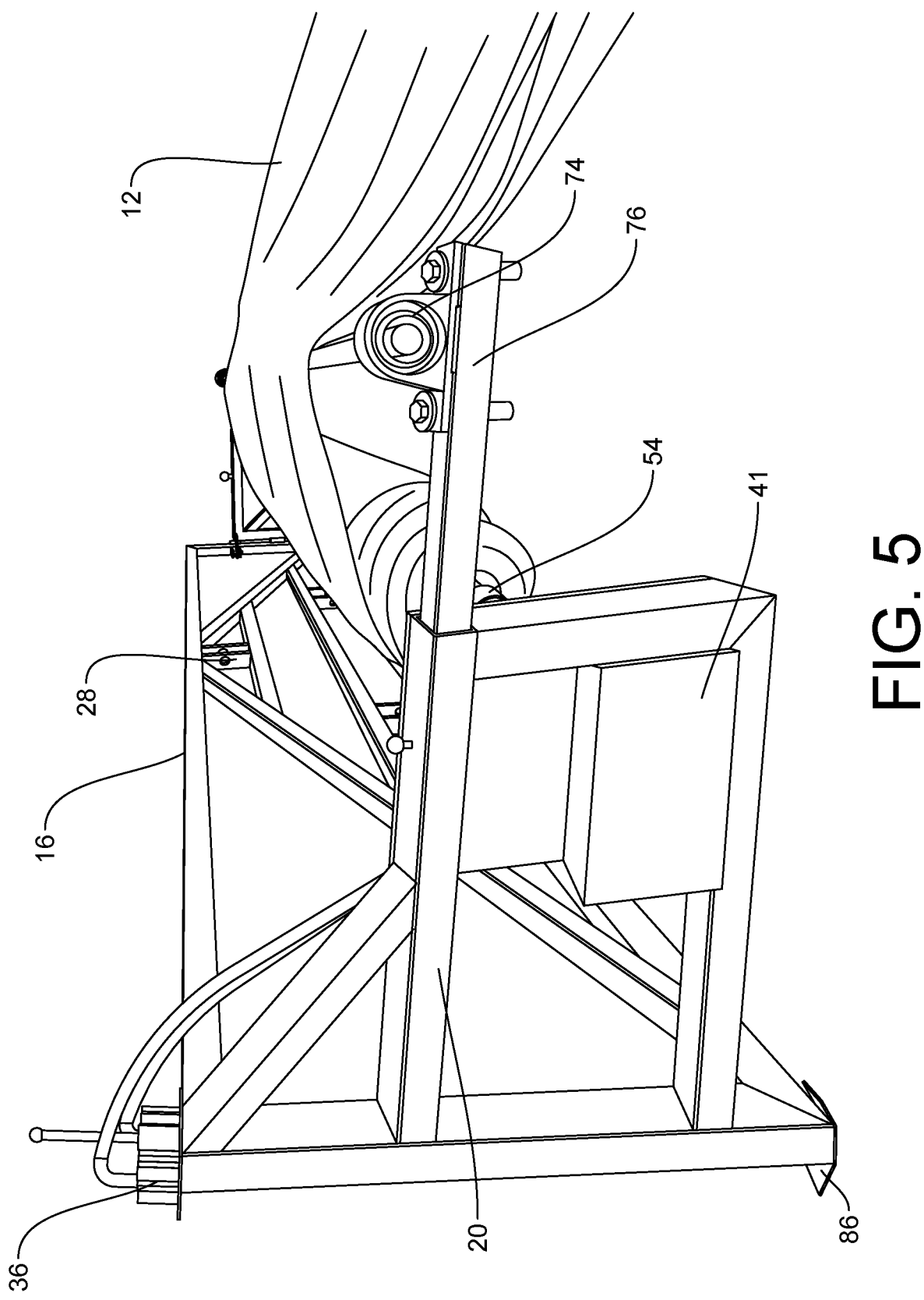
FIG. 5 is a side view of a tarp being rolled on the tarp roller.

The frame 16 has a first support arm 20 extending therefrom and a second support arm 22 extending therefrom. The second support arm 22 is spaced apart from the first support arm 20. Typically, though not necessarily, the frame 16 will measure approximately 2-3 meters wide from its first end 24 to its second end 26. It has been found that frame widths in this range provide a tarp roller which can be easily mounted to and towed behind a tow vehicle such as a tractor or fork lift. The frame 16 is adapted for towing behind the tow vehicle 18. As best seen in FIG. 1 and FIG. 4, the adaptation is typically a hitch mount bracket 28 for use with a conventional three-point tractor hitch 19. Other adaptations for mounting may be substituted. The hydraulics of the tow vehicle 18 are used to power the raising and lowering of the tarp roller 10 by means of the three-point tractor hitch 19.

Figure 2:
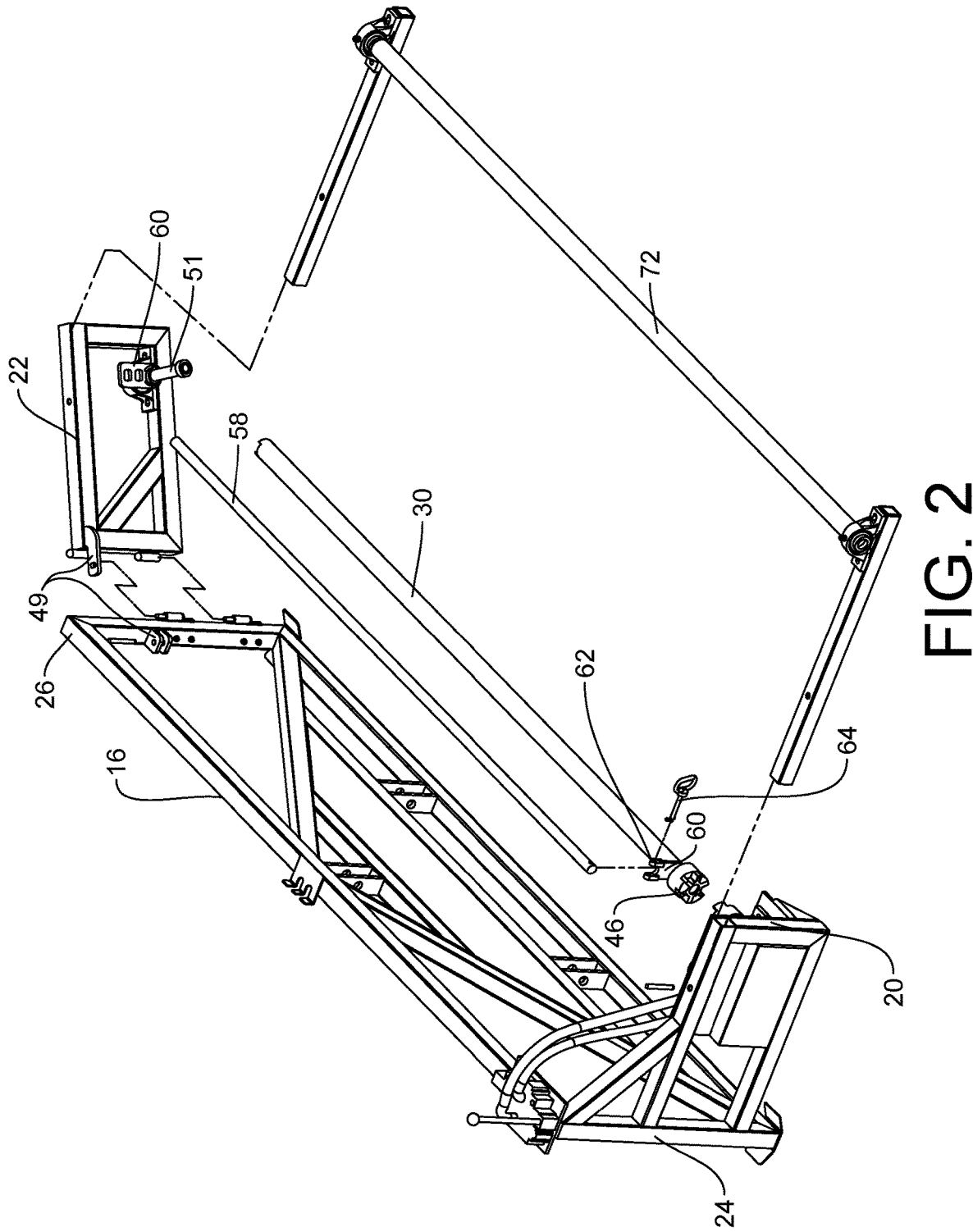
FIG. 2 is an exploded view of the tarp roller of FIG. 1.
Figure 3:
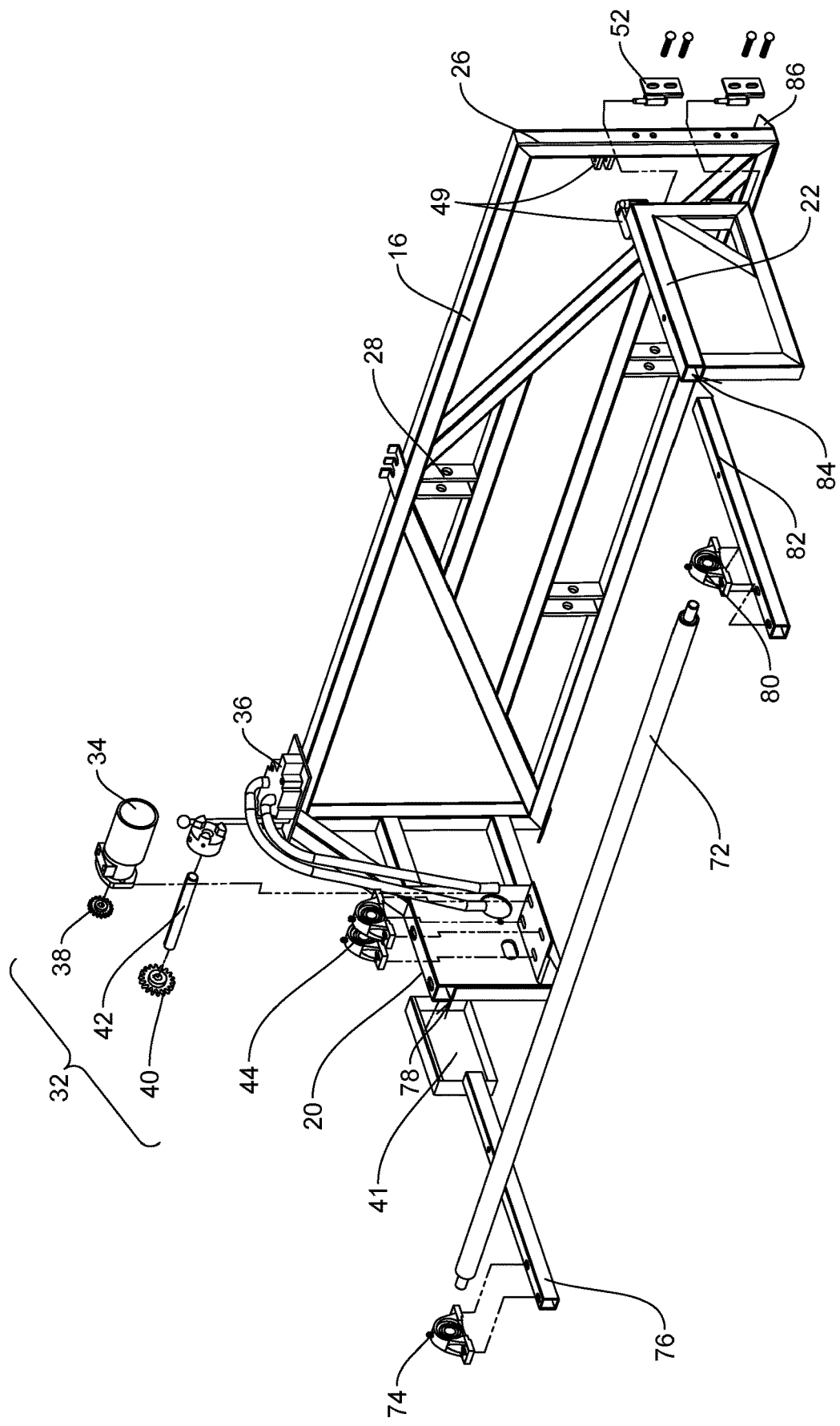
FIG. 3 is a second exploded view of the tarp roller of FIG. 1 taken at a different angle.

A primary rotatable spindle 30 is powered and removably connected between the first support arm 20 and the second support arm 22. Different options exist for mounting the primary rotatable spindle 30 to the frame 16 of a tarp roller and powering it for rotation. The primary rotatable spindle 30 could be direct driven off a hydraulic motor positioned in line with the primary rotatable spindle; however, this arrangement would significantly increase the overall width of the tarp roller. Alternatively, a power train can be used to transfer power from a motor to a drive shaft for rotation of the primary rotatable spindle. Details of the preferred embodiment of the manner of connection and power are best seen in the exploded views of the tarp roller 10 shown in FIG. 2 and FIG. 3. The primary rotatable spindle 30 is removably connected to the first support arm 20 through a drive coupling assembly 32 operatively connected to a hydraulic motor 34. The drive coupling assembly 32 can be constructed as an assembly of known parts. The component parts of a coupling assembly 32 and the manner by which the primary rotatable spindle 30 is powered according to an embodiment of the present invention are shown in FIG. 3 for illustrative purposes only. A hydraulic controller 36, is in operative connection with the hydraulic system of the tow vehicle 18. The hydraulic controller 36 controls the operation of the hydraulic motor 34, which is operatively connected by means of a motor sprocket 38, drive chain (not shown) and a roller sprocket 40 through shaft 42. A chain guard 41 may be secured to the first support arm 20 to protect the sprocket and drive chain system. A pillow block bearing 44 supports the shaft 42 which is operatively connected by a spider coupling 46 into which a first end (not seen) of the primary rotatable spindle 30 is received in the spider coupling 46 for support and to power rotation. A second end 48 of primary rotatable spindle 30 receives and is supported on a spindle support shaft 51 held by a bearing 50 mounted on the second support arm 22. The spindle support shaft 51 transfers the downward load (resulting from the weight of the primary rotatable spindle and the rolled tarp) onto the second support arm 22 of the frame 16. This arrangement protects the bearing 50 which is designed to take load in the vertical direction and cannot withstand significant twisting forces.

In an embodiment of the invention, the second support arm 22 of the tarp roller 10 is removably attached to the second end 26 of the frame 16. The removeable attachment means 52 may take one of several forms. One embodiment of a removeable attachment means can be seen in FIG. 3. A hinge 52 is used, and its mating component parts of the hinge are attached to the second end 26 of the frame 16 and to the second support arm 22. It would be possible to disengage the hinge pin from the hinge to remove the second support arm 22 from the frame 16.

Although it is not illustrated in the figures, another example, of a moveable attachment means could comprise one or more rectangular tube brackets fixed to the second support arm 22 and then received in a telescoping manner within the rectangular steel tubes which form the frame 16. Removable anchoring pins could be secured through the brackets and rectangular steel tubes of the frame 16 to secure the second support arm in attached relation to the frame.

In the preferred embodiment of the invention, the second support arm 22 is moveably attached to the frame 16. Not only does the hinge 52 provide removable attachment, as discussed above, but it also permits the second support arm 22 to be moveable while it is attached to the frame 16. A latch 49 is positioned near the hinge 52 and mating component parts of the latch 49 are mounted to the frame 16 and the second support arm 22. A latch pin (not shown) can be inserted through the mating components of the latch 49 to secure it in a closed position. The removal of the second arm support 22 from the frame 16, or the movement of the second support arm 22 with respect to the frame 16 provides sufficient space for disengaging the primary rotatable spindle 30 out of its rolling/working position thus allowing the removal of a roll of tarp from the tarp roller.

In the preferred embodiment of the invention as shown in the figures, the moveable attachment means 52 is a hinge. In FIG. 4 the latch 49 is open and the hinge 52 has been actuated to pivot the second support arm 22 relative to the second end 26 of the frame 16 thereby increasing the distance between the first support arm 20 and the second support arm 22 when considered at the locations where the first end of the primary rotatable spindle 30 is mated with the coupling assembly 32 mounted to the first support arm 20, and the second end 48 of the primary spindle 30 mates with the bearing 50 on the second support arm 22. Varying the distance between the first support 20 arm and the second support arm 22 at this point permits disengagement of the ends of the primary rotatable spindle 30 from the drive coupling assembly 32 and from the spindle support shaft 51 and its bearing 50. When the primary rotatable spindle 30 has been disengaged, a tarp spool 54 can be slid over the primary rotatable spindle 30.

The tarp roller 10 further comprises a retainer 56 for retaining the tarp 12 against the primary rotatable spindle 30. The retainer 56 can be seen in operation in FIG. 4, and its components can be seen in greater detail in the exploded view in FIG. 2. The retainer 56 comprises an elongate member 58 mounted in removable, spaced apart, coaligned relation with the primary rotatable spindle 30 to move with the primary rotatable spindle 30 as it rotates. A retainer mounting plate 60 is fitted to the primary rotatable spindle 30 adjacent to spider coupling 46. The retainer mounting plate 60 defines a channel 62 to receive the elongate member 58 in torque transmitting engagement. In addition to securing the elongate member 58 and transferring torque from the primary rotatable spindle 30 to elongate member 58, the retainer mounting plate 60 also eliminates twisting thereof. A U-cap and lock pin assembly 64 secures the elongate member 58 within the channel 62 forming a pivot point. The U-cap and lock pin assembly 64 secures the elongate member 58 in position during the rolling operation and prevents the elongate member 58 from sliding left or right and becoming disengaged. A retainer end plate 66 rides on the bearing 50 located on the second support arm 22. The retainer end plate 66 defines an opening 68 to receive the primary rotatable spindle 30. The retainer end plate 66 also defines an opening 70 through which the elongate member 58 is received. Multiple openings 70,70 may be positioned along the second primary roller end plate 66 at specified distances from the opening 68 for the primary rotatable spindle 30. The selection of which opening 70 receives the elongate member 58 will determine the distance between the primary rotatable spindle 30 and the elongate member 58. This feature permits adjustment of the retainer 56 to accommodate different tarp thicknesses and provides control over how tightly the tarp 12 will be retained against the primary rotatable spindle 30. In use, an end of the tarp 12 is placed between the primary rotatable spindle 30 and the elongate member 58 of the retainer 56 and retained against the primary rotatable spindle 30 as it is rotated, thereby winding the tarp 12.

The tarp roller 10 further comprises a secondary guide roller 72 rotatably attached to the frame 16 at a position above and forward of the primary rotatable spindle 30. The secondary guide roller 72 is rotatably mounted (at a first end thereof) by means of a first pillow block bearing 74 fastened to a first bracket 76, which may be received in a socket 78 defined by the first support arm 20. At a second end thereof, the secondary guide roller 72 is rotatably mounted by means of a second pillow block bearing 80 which is fastened to a second bracket 82, which may be received in a socket 84 in the second support arm 22. The position of the secondary guide roller 72 in front of the primary rotatable spindle 30 ensures that, in use, the length of tarp 12 will first contact the secondary guide roller 72 as it is pulled toward the rotating primary rotatable spindle 30. As the tarp 12 contacts the secondary guide roller 72 loose dirt may fall away from the tarp 12. The position of the secondary guide roller 72 above the primary rotatable spindle 30 creates a downward path of travel as the tarp 12 moves toward and is rolled onto the primary rotatable spindle 30. The tarp 12 is pressed downward against the secondary guide roller 72 as it travels the downward path, compressing folds of the tarp. The compression of the tarp results causes a tighter roll to form on the primary rotatable spindle 30 and also forces out any water entrained within the folds of the tarp 12.

The frame 16 further comprises a skid plates 86, 86 mounted at either thereof. Each skid plate 86 provides a smooth and somewhat rounded surface which will contact the ground surface 14 during rolling and unrolling of the tarp. The skid plates 86 distribute the weight of the tarp roller more evenly on the ground surface. The skid plates 86 reduce the risk of damage to high value ground surfaces such as manicured golf greens in the rare case that the user forgets to raise the tarp roller 10 out of contact with the ground before moving forward.

In use, the tarp roller 10 is mounted on the three-point hitch of the tow vehicle 18, typically a tractor, and it powered by its hydraulic system. The tarp 12 must be lifted from the ground surface and folded onto itself to form a multilayered strip having a width of approximately 2 meters and a length determined by its overall dimensions in preparation for rolling. Typically, a tarp spool 54 is placed over the primary rotatable spindle 30 prior to commencing the rolling process to facilitate easy handling of the rolled tarp 12, but this step is optional. Without a spool it can be difficult to remove the tarp 12 from the primary rotatable spindle 30. The use of a spool allows the rolled-up tarp 12 to be placed back onto the tarp roller 10 to be unwound onto the turf; however the use of a spool is not necessary for the tarp roller 10 to function.

The method of rolling a tarp 12 comprises the following steps. The first step is feeding the tarp 12 over the secondary guide roller 72. The tarp 12 is then placed between the primary rotatable spindle 30 and the retainer 56. The primary rotatable spindle 30 is rotated in a first direction to spool the tarp 12 onto the primary rotatable spindle 30. In situations where the tarp 12 is only a layer or two thick, it can be fed between the primary rotatable spindle 30 and the retainer 56.

It is more common for the tarp 12 to be quite thick when it is ready to be rolled, as it typically needs to be folded multiple times in order to achieve an approximately 2 m width needed to fit the primary rotatable spindle 30 of the tarp roller 12. In this situation, the tarp 12 is placed over the secondary guide roller 72 and placed over the primary rotatable spindle 30. The retainer 56 is installed on top of the tarp 12 by feeding the elongate member 58 into the channel 62 of the retainer mounting plate 60 and into the channel 70 of the retainer end plate 66. The elongate member is then secured in place with the U-cap and lock pin assembly 64. There may be multiple channels 70 in the retainer end plate 66 and the user can select one of the channels to fit the elongate member 58 such that it holds the tarp 12 securing against the primary rotatable spindle 30 regardless of the thickness of the folded tarp 12. After the primary rotatable spindle 30 has been rotated in a first direction to take up the tarp, the rolled tarp may be secured with rope or strapping so that it does not unroll.

The method of rolling the tarp continues with the steps of rotating the primary rotatable spindle in an opposite direction to release tension within the rolled tarp; separating the primary rotatable spindle 30 and the retainer 56 from the frame 16 of the tarp roller; and, removing the primary rotatable spindle 30 and the retainer 56 from the rolled tarp. The following description will provide greater detail regarding the manner in which these steps are carried out. In order to stabilize the rolled tarp, the three-point hitch 19 is lowered so that the frame 16 of the tarp roller 10 is in contact with the ground surface 14 and the rolled tarp 12 rests on the ground surface 14. Once the tarp 12 rests on the ground surface, the hydraulic controller 36 is actuated to rotate the primary rotatable spindle 30 in the opposite direction for two revolutions to release tension within the rolled tarp 12. In order to provide additional work space, particularly if the user is working with a large roll, the secondary roller 72 may be removed from the tarp roller 10 by removing the first bracket 76 from the first socket 78 in the first support arm 20 and removing the second bracket 82 from the second socket 84 in the second support arm 22.

After the secondary roller 72 has been removed, the second support arm 22 is moved by removing the latch pin from latch 49 and swinging the second support arm 22 on hinge 52 to a more distant position to provide clearance space. The primary rotatable spindle 30 is then separated from the drive coupling assembly 32 and the spindle support shaft 51 is removed from the primary rotatable spindle 30. The tow vehicle 18 with the frame 16 can then be moved out of the way. The primary rotatable spindle 30 and the retainer 56 are then removed from the rolled tarp 12. The tarp roller 10 may then be reassembled by reversing the foregoing steps.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A tarp roller for rolling a tarp comprising:
   (a) a frame adapted for mounting to a tow vehicle, said frame having a first support arm extending therefrom, and a second support arm extending therefrom and spaced part from the first support arm;
   (b) a primary rotatable spindle connected between the first support arm and the second support arm, through a drive coupling assembly operatively connected to a hydraulic motor for rotation of the primary rotatable spindle;
   (c) said primary rotatable spindle having a retainer mounting plate fitted thereto, said retainer mounting plate defining a channel to receive and fix an elongate member in spaced apart, coaligned relation to the primary rotatable spindle to retain the tarp between the elongate member and the primary rotatable spindle;
   (d) said retainer mounting plate transmitting torque from the primary rotatable spindle to the elongate member to move the elongate member with the primary rotatable spindle as the primary rotatable spindle rotates.

2. The tarp roller of claim 1, further comprising a retainer end plate defining an opening to receive the primary rotatable spindle and an opening to receive the elongate member.

3. The tarp roller of claim 2, wherein the retainer end plate defines multiple openings to receive the elongate member at specified distances from the opening to receive the primary rotatable spindle; whereby the space between the primary rotatable spindle and the elongate member may be adjusted by the selection of an opening to receive the elongate member.

4. The tarp roller of claim 1, wherein the second support arm is removably attached to the frame.

5. The tarp roller of claim 1, wherein the second support arm is movably attached to the frame.

6. The tarp roller of claim 5, wherein the second support arm is movably attached to the frame by means of a hinge.

7. The tarp roller of claim 1, further comprising a secondary guide roller rotatably attached to the frame at a position above and forward of the primary rotatable spindle.

8. A method of rolling a tarp comprising the steps of:
   (a) feeding the tarp over a secondary roller attached to a frame of a tarp roller at a position above and forward of a primary rotatable spindle;
   (b) placing the tarp between the primary rotatable spindle and an elongate member fixed by a retainer mounting plate to the primary rotatable spindle in spaced apart, coaligned relation to the primary rotatable spindle to retain the tarp between the elongate member and the primary rotatable spindle; and
   (c) rotating the primary rotatable spindle through a drive coupling assembly operatively connected to a hydraulic motor for rotation of the primary rotatable spindle, and transmitting torque from the primary rotatable spindle to the elongate member through said mounting plate to move the elongate member with the primary rotatable spindle as the primary rotatable spindle rotates in a first direction to take up the tarp.

9. The method of claim 8, further comprising the steps of:
   (d) rotating the primary rotatable spindle in an opposite direction to release tension within the rolled tarp;
   (e) separating the primary rotatable spindle and the retainer from the frame of the tarp roller; and
   (f) removing the primary rotatable spindle and the retainer from the rolled tarp.

* * * * *